US 9,237,079 B2

(12) United States Patent
Bragstad et al.

(10) Patent No.: US 9,237,079 B2
(45) Date of Patent: Jan. 12, 2016

(54) INCREASING PERFORMANCE OF A STREAMING APPLICATION BY RUNNING EXPERIMENTAL PERMUTATIONS

(71) Applicant: International Business Machines Corporation, Armonk, NY (US)

(72) Inventors: Lance Bragstad, Pine Island, MN (US); Michael J. Branson, Rochester, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 14/084,168

(22) Filed: Nov. 19, 2013

(65) Prior Publication Data

US 2015/0142951 A1  May 21, 2015

(51) Int. Cl.
| | |
|---|---|
| *H04L 12/26* | (2006.01) |
| *G06F 9/455* | (2006.01) |
| *H04L 12/24* | (2006.01) |
| *G06F 9/50* | (2006.01) |
| *H04L 29/08* | (2006.01) |

(52) U.S. Cl.
CPC ............ *H04L 43/0817* (2013.01); *G06F 9/455* (2013.01); *G06F 9/45533* (2013.01); *G06F 9/50* (2013.01); *H04L 41/5019* (2013.01); *H04L 67/1002* (2013.01)

(58) Field of Classification Search
CPC ....................................................... G06F 9/50
See application file for complete search history.

(56) References Cited

U.S. PATENT DOCUMENTS

| | | | |
|---|---|---|---|
| 7,272,820 B2 * | 9/2007 | Klianev ................ | G06F 9/5038 717/101 |
| 8,386,466 B2 | 2/2013 | Park et al. | |
| 8,694,994 B1 * | 4/2014 | Vincent ................. | G06F 9/5094 718/1 |
| 9,015,708 B2 * | 4/2015 | Choudhury ......... | G06F 9/45558 709/223 |
| 9,021,477 B2 * | 4/2015 | Choudhury ......... | G06F 9/45558 709/223 |
| 9,027,024 B2 * | 5/2015 | Mick ................... | H04L 43/0817 709/224 |
| 2010/0229178 A1 | 9/2010 | Ito | |
| 2012/0179809 A1 * | 7/2012 | Barsness ........... | G06F 17/30516 709/224 |

(Continued)

OTHER PUBLICATIONS

Cervino et al., "Adaptive Provisioning of Stream Processing Systems in the Cloud," 2012 IEEE 28th International Conference on Data Engineering Workshops (ICDEW), Apr. 2012.

*Primary Examiner* — Shirley Zhang
(74) *Attorney, Agent, or Firm* — Martin & Associates, LLC; Derek P. Martin (57) ABSTRACT

A streams manager monitors performance of a streaming application, and when the performance needs to be improved, the streams manager automatically requests virtual machines from a cloud manager. In response, the cloud manager provisions one or more virtual machines in a cloud. The streams manager builds a permutation of a flow graph for the streaming application using the virtual machine(s), runs the permutation in parallel with the corresponding portion of the flow graph, and compares the performance of the original portion of the flow graph to the performance of the permutation. When the performance of the permutation exceeds the performance of the original part of the flow graph, the streams manager modifies the flow graph so the permutation replaces the original part of the flow graph. In this manner a streaming application can dynamically evolve to increase its performance as needed.

8 Claims, 10 Drawing Sheets

(56) References Cited

U.S. PATENT DOCUMENTS

| | | | |
|---|---|---|---|
| 2012/0304192 A1* | 11/2012 | Grove | G06F 9/5083 718/105 |
| 2012/0317276 A1 | 12/2012 | Muniraju | |
| 2013/0031124 A1 | 1/2013 | Santosuosso et al. | |
| 2013/0054779 A1 | 2/2013 | Cradick et al. | |
| 2013/0103832 A1 | 4/2013 | Cradick et al. | |
| 2013/0173587 A1* | 7/2013 | Imaki | G06F 17/30516 707/713 |
| 2013/0198489 A1 | 8/2013 | Branson et al. | |
| 2013/0297802 A1* | 11/2013 | Laribi | H04L 12/6418 709/226 |
| 2014/0068577 A1* | 3/2014 | Gedik | G06F 8/456 717/143 |
| 2014/0068578 A1* | 3/2014 | Gedik | G06F 8/456 717/143 |
| 2014/0196017 A1* | 7/2014 | Halim | G06F 8/45 717/149 |
| 2014/0201642 A1* | 7/2014 | Vicat-Blanc | H04L 41/22 715/736 |
| 2014/0215077 A1* | 7/2014 | Soudan | H04L 47/11 709/226 |
| 2014/0280595 A1* | 9/2014 | Mani | H04L 65/403 709/204 |
| 2015/0127807 A1* | 5/2015 | Billore | H04L 41/145 709/224 |
| 2015/0127815 A1* | 5/2015 | Billore | H04L 41/145 709/224 |
| 2015/0128131 A1* | 5/2015 | Cao | G06F 9/45533 718/1 |
| 2015/0142951 A1* | 5/2015 | Bragstad | G06F 9/45533 709/224 |
| 2015/0142952 A1* | 5/2015 | Bragstad | H04L 41/5019 709/224 |
| 2015/0142956 A1* | 5/2015 | Bragstad | H04L 41/5019 709/224 |
| 2015/0143365 A1* | 5/2015 | Bragstad | G06F 9/45533 718/1 |
| 2015/0205627 A1* | 7/2015 | Cao | G06F 9/45533 718/1 |
| 2015/0207749 A1* | 7/2015 | Cao | G06F 9/45533 709/226 |

* cited by examiner

| Permutation Types |
| --- |
| Reorder Operators |
| Coalesce Operators |
| Split Operator(s) |

INCREASING PERFORMANCE OF A STREAMING APPLICATION BY RUNNING EXPERIMENTAL PERMUTATIONS

BACKGROUND

1. Technical Field

This disclosure generally relates to streaming applications, and more specifically relates to enhancing performance of a streaming application by running experimental permutations.

2. Background Art

Streaming applications are known in the art, and typically include multiple operators coupled together in a flow graph that process streaming data in near real-time. An operator typically takes in streaming data in the form of data tuples, operates on the tuples in some fashion, and outputs the processed tuples to the next operator. Streaming applications are becoming more common due to the high performance that can be achieved from near real-time processing of streaming data.

Many streaming applications require significant computer resources, such as processors and memory, to provide the desired near real-time processing of data. However, the workload of a streaming application can vary greatly over time. Allocating on a permanent basis computer resources to a streaming application that would assure the streaming application would always function as desired (i.e., during peak demand) would mean many of those resources would sit idle when the streaming application is processing a workload significantly less than its maximum. Furthermore, what constitutes peak demand at one point in time can be exceeded as the usage of the streaming application increases. For a dedicated system that runs a streaming application, an increase in demand may require a corresponding increase in hardware resources to meet that demand.

BRIEF SUMMARY

A streams manager monitors performance of a streaming application, and when the performance needs to be improved, the streams manager automatically requests virtual machines from a cloud manager. In response, the cloud manager provisions one or more virtual machines in a cloud. The streams manager builds a permutation of a flow graph for the streaming application using the virtual machine(s), runs the permutation in parallel with the corresponding portion of the flow graph, and compares the performance of the original portion of the flow graph to the performance of the permutation. When the performance of the permutation exceeds the performance of the original part of the flow graph, the streams manager modifies the flow graph so the permutation replaces the original part of the flow graph. In this manner a streaming application can dynamically evolve to increase its performance as needed.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein relate to a streams manager that monitors performance of a streaming application, and when the performance needs to be improved, the streams manager automatically requests virtual machines from a cloud manager. In response, the cloud manager provisions one or more virtual machines in a cloud. The streams manager builds a permutation of a flow graph for the streaming application using the virtual machine(s), runs the permutation in parallel with the corresponding portion of the flow graph, and compares the performance of the original portion of the flow graph to the performance of the permutation. When the performance of the permutation exceeds the performance of the original part of the flow graph, the streams manager modifies the flow graph so the permutation replaces the original part of the flow graph. In this manner a streaming application can dynamically evolve to increase its performance as needed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
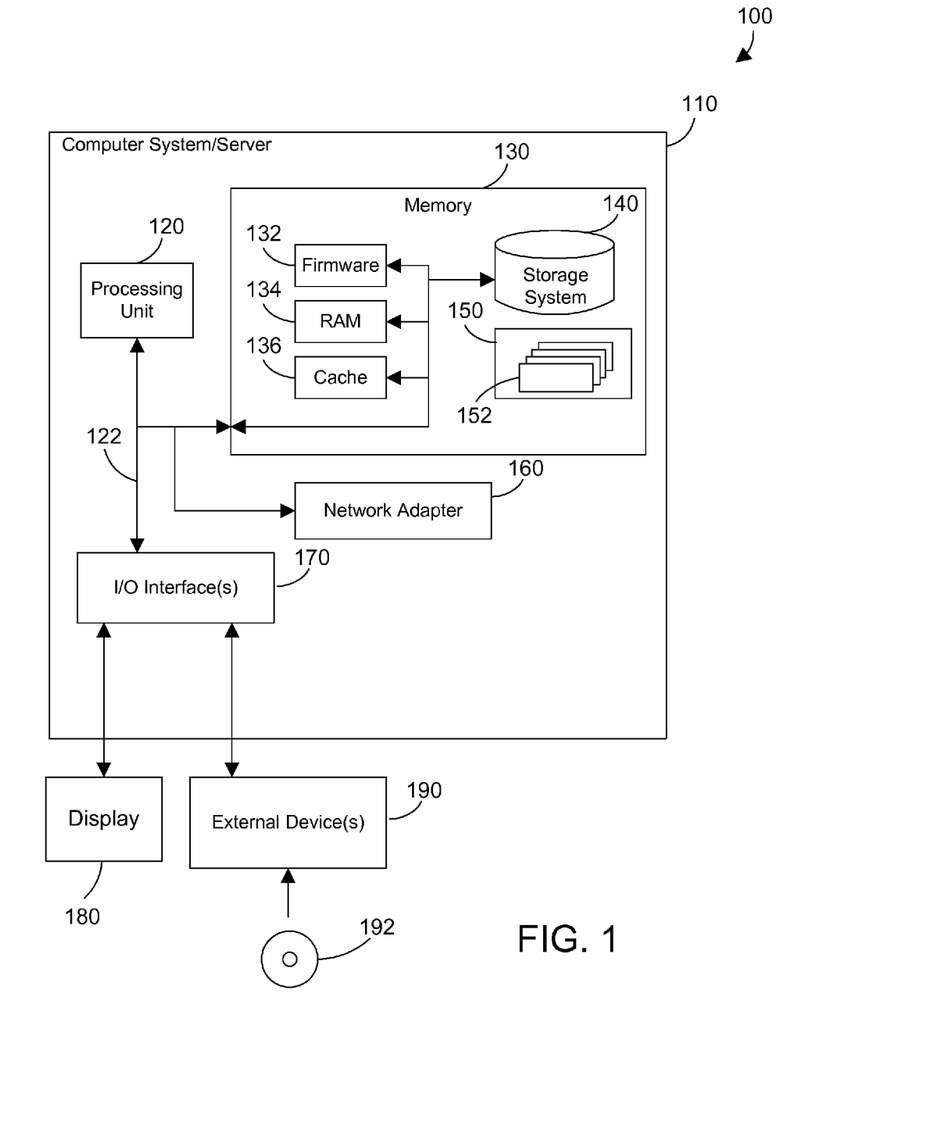
FIG. 1 is a block diagram of a cloud computing node.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/ server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
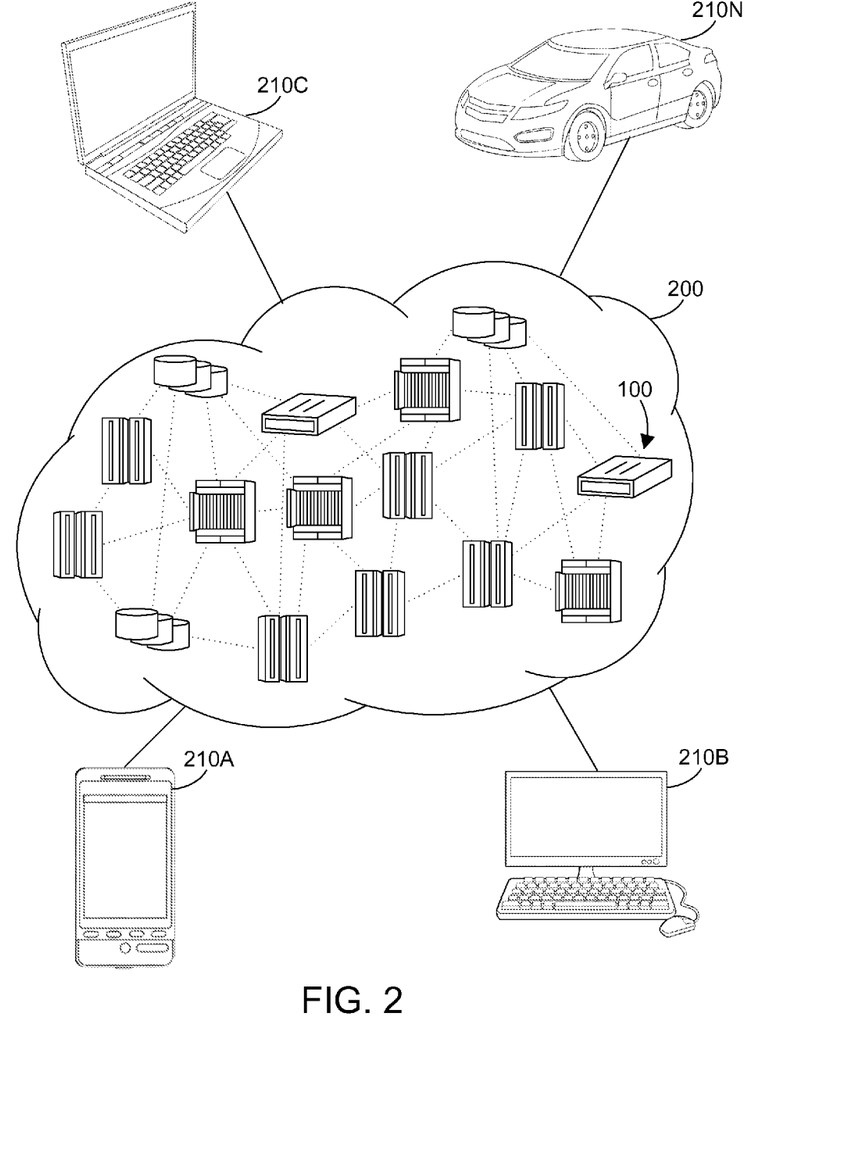
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
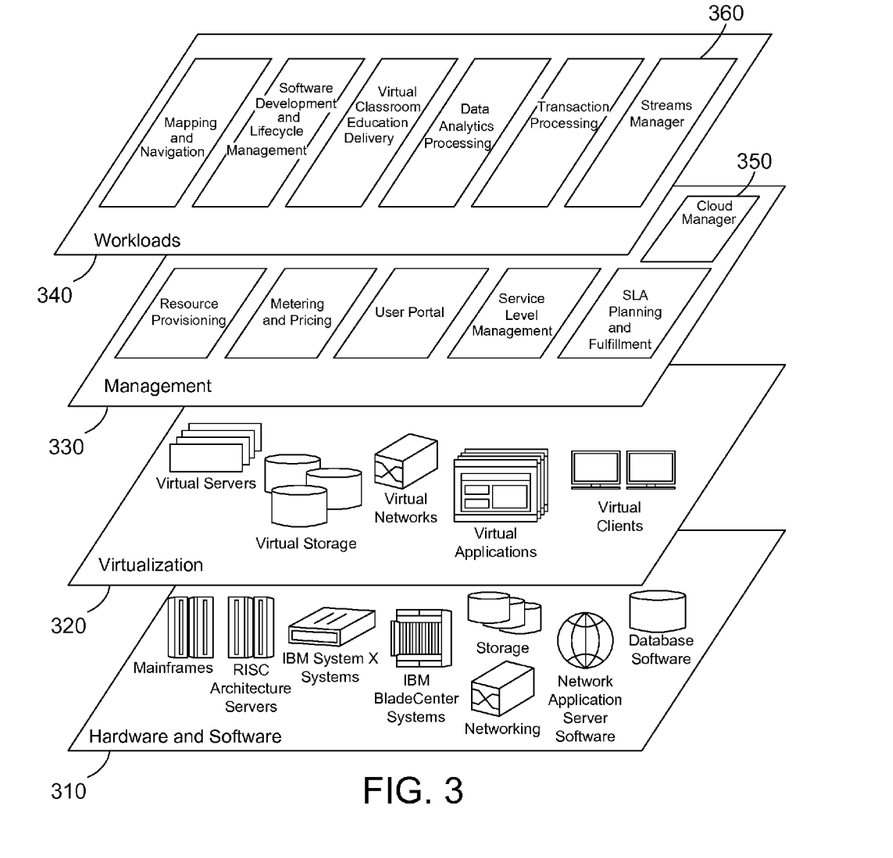
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a streams manager 360, as discussed in more detail below.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
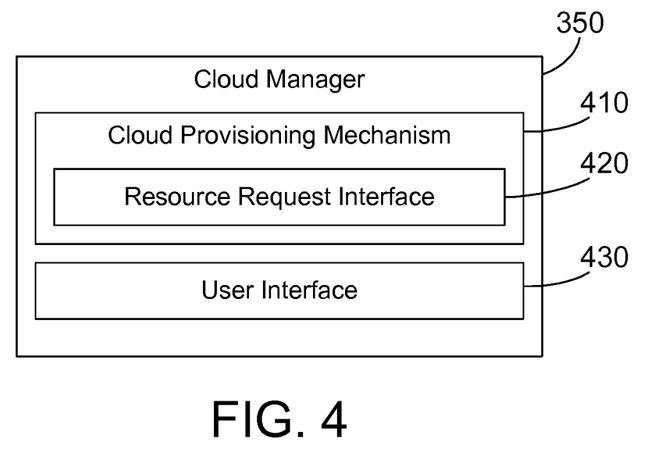
FIG. 4 is a block diagram showing some features of a cloud manager.

FIG. 4 shows one suitable example of the cloud manager 350 shown in FIG. 3. The cloud manager 350 includes a cloud provisioning mechanism 410 that includes a resource request interface 420. The resource request interface 420 allows a software entity, such as the streams manager 360, to request virtual machines from the cloud manager 350 without human intervention. The cloud manager 350 also includes a user interface 430 that allows a user to interact with the cloud manager to perform any suitable function, including provisioning of VMs, destruction of VMs, performance analysis of the cloud, etc. The difference between the resource request interface 420 and the user interface 430 is a user must manually use the user interface 430 to perform functions specified by the user, while the resource request interface 420 may be used by a software entity to request provisioning of cloud resources by the cloud mechanism 350 without input from a human user. Of course, cloud manager 350 could include many other features and functions known in the art that are not shown in FIG. 4.

Figure 5:
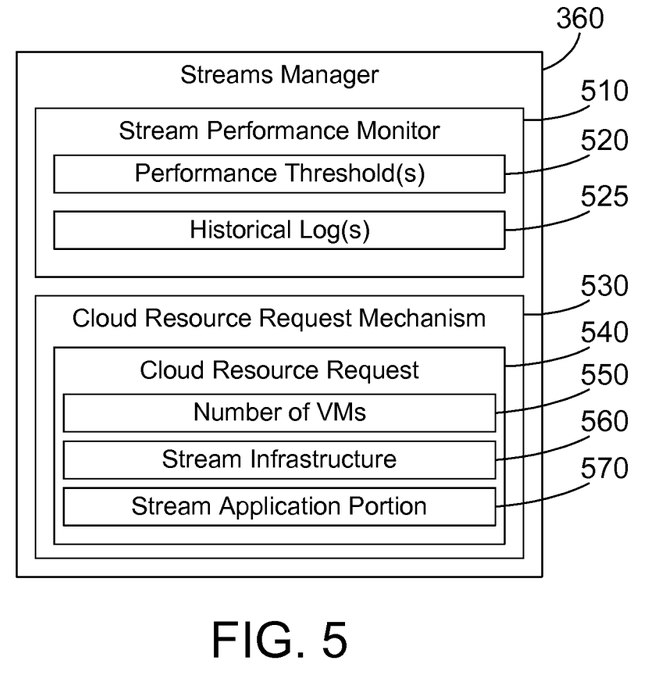
FIG. 5 is a block diagram showing some features of a streams manager.

FIG. 5 shows one suitable example of the streams manager 360 shown in FIG. 3. The streams manager 360 is software that manages one or more streaming applications, including creating operators and data flow connections between operators in a flow graph that represents a streaming application. The streams manager 360 includes a performance monitor 510 with one or more performance thresholds 520. Performance thresholds 520 can include static thresholds, such as percentage used of current capacity, and can also include any suitable heuristic for measuring performance of a streaming application as a whole or for measuring performance of one or more operators in a streaming application. Performance thresholds 520 may include different thresholds and metrics at the operator level, at the level of a group of operators, and/or at the level of the overall performance of the streaming application. The stream performance monitor 510 monitors performance of a streaming application, and when current performance compared to the one or more performance thresholds 520 indicates current performance needs to be improved, the stream performance monitor 510 communicates the need for resources to the cloud resource request mechanism 530. The cloud resource request mechanism 530, in response to the communication from the stream performance monitor, assembles a cloud resource request 540, which can include information such as a number of VMs to provision 550, stream infrastructure needed in each VM 560, and a stream application portion 570 for each VM. Once the cloud resource request 530 is formulated, the streams manager 360 submits the cloud resource request 540 to a cloud manager, such as cloud manager 350 shown in FIGS. 3 and 4.

The cloud resource request can be formatted in any suitable way. A simple example will illustrate two suitable ways for formatting a cloud resource request. Let's assume the streams manager determines it needs two VMs, where both have common stream infrastructure, with a first of the VMs hosting operator A and the second of the VMs hosting operator B. The cloud resource request 540 in FIG. 5 could specify two VMs at 550, could specify the common stream infrastructure, such as an operating system and middleware, at 560, and could specify operator A and operator B at 570. In response, the cloud manager would provision two VMs with the common stream infrastructure, with the first of the VMs hosting operator A and the second of the VMs hosting operator B. In the alternative, the cloud resource request 540 could be formulated such that each VM is specified with its corresponding stream infrastructure and stream application portion. In this configuration, the cloud resource request would specify a first VM with the common stream infrastructure and operator A, and a second VM with the common stream infrastructure and operator B.

Figure 6:
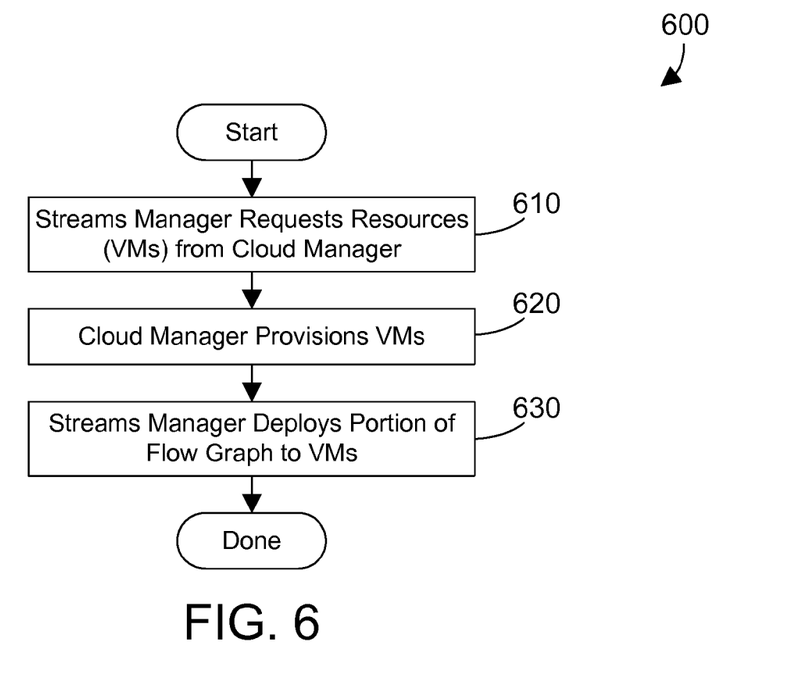
FIG. 6 is a flow diagram of a method for a streams manager to request and receive from a cloud manager virtual machines to improve performance of a streaming application.

Referring to FIG. 6, a method 600 shows one suitable example for enhancing performance of a streaming application, and is preferably performed by the streams manager 360 interacting with the cloud manager 350. The streams manager requests resources, such as VMs, from the cloud manager (step 610). The cloud manager provisions the VMs (step 620). The streams manager then deploys a portion of the flow graph to the VMs (step 630). When the streaming application is not initially hosted in the cloud, the result will be a hybrid implementation of the streams application, with some portions hosted on a dedicated computer system and other portions hosted by one or more VMs in the cloud.

Figure 7:
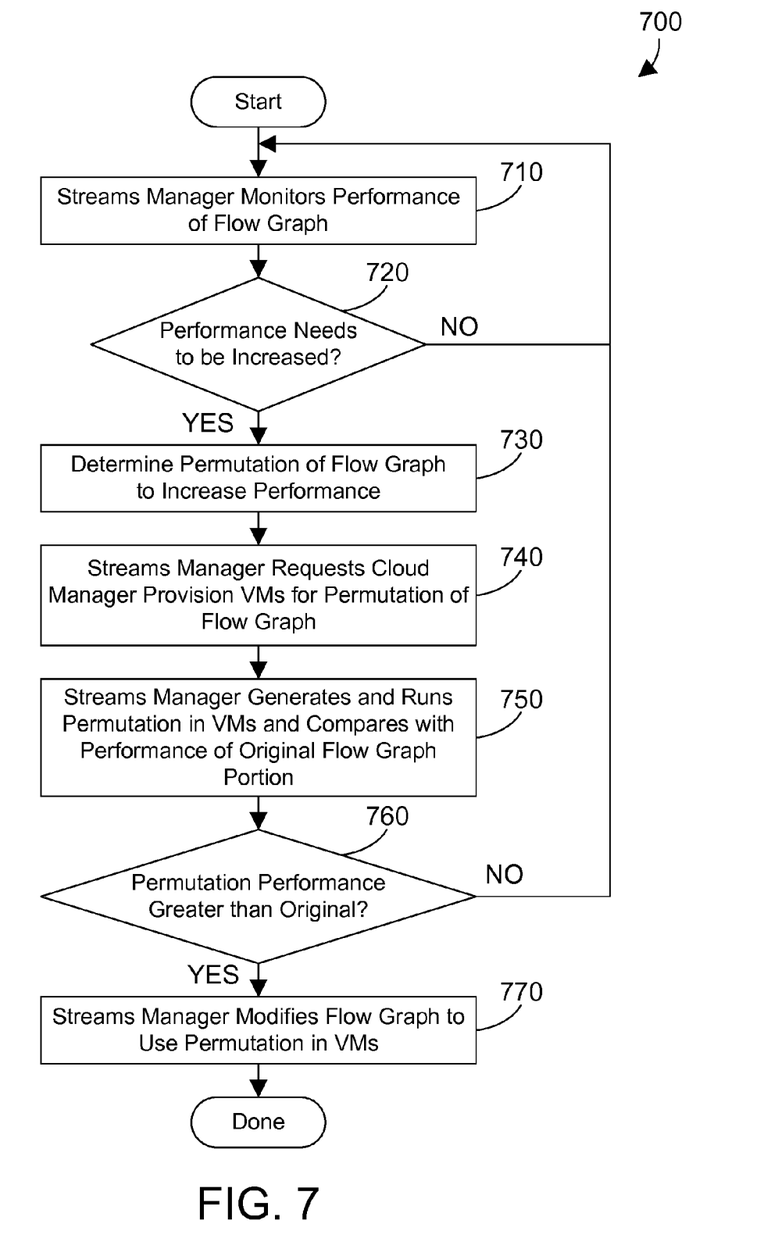
FIG. 7 is a flow diagram of a method for a streams manager to automatically generate a permutation of a flow graph and modify the flow graph when performance of the permutation exceeds performance of the corresponding original portion of the flow graph.

FIG. 7 shows one suitable example of a method 700 for enhancing performance of a streaming application. The streams manager monitors performance of the flow graph (step 710). This can be done, for example, by comparing current performance to one or more performance thresholds. When performance does not need to be increased (step 720=NO), method 700 loops back to step 710 and continues. When performance needs to be increased (step 720=YES), a permutation of the flow graph is defined to increase performance (step 730). As used herein, a permutation of the flow graph can include any suitable implementation of any suitable portion of the flow graph that provides logical equivalence of tuples. A permutation can include, for example, reordering operators, coalescing operators, and/or splitting operators. The streams manager requests the cloud manager provision VMs for the permutation of the flow graph (step 740). The streams manager generates and runs the permutation in the VMs in parallel with the existing flow graph and compares the performance of the permutation with the performance of the corresponding existing portion of the flow graph (step 750). When the performance of the permutation is greater than the performance of the original (step 760=YES), the streams manager modifies the flow graph to use the permutation (step 770). When the performance of the permutation is not greater than the original (step 760=NO), method 700 loops back to step 710 and continues.

The determination of whether the permutation performance is greater than performance of the corresponding original portion of the flow graph in step 760 can include any suitable threshold for making the decision. A simple example will illustrate. If the performance of the permutation is only 1% greater than the performance of the original portion of the flow graph, the expense of implementing the permutation may exceed its benefits. For example, due to the cost of implementing a portion of the flow graph in a cloud, one might specify the performance of the permutation implemented in the cloud must exceed the performance of the original portion of the flow graph by 20%. Of course, any suitable threshold, criteria or heuristic could be used in determining whether the performance of the permutation exceeds the performance of the original portion of the flow graph enough to justify making the change. Step 760 herein includes using any suitable threshold, criteria or heuristic for determining whether the performance of the permutation is sufficiently greater than the original to justify making the change.

As shown in FIG. 7, the streams manager may try different permutations when the streams manager determines performance of a streaming application represented by a flow graph needs to be increased. The streams manager may thus experiment with different permutations on an ongoing basis in an effort to dynamically increase the performance of the streaming application. This allows the streaming application to dynamically evolve over time.

Figure 8:
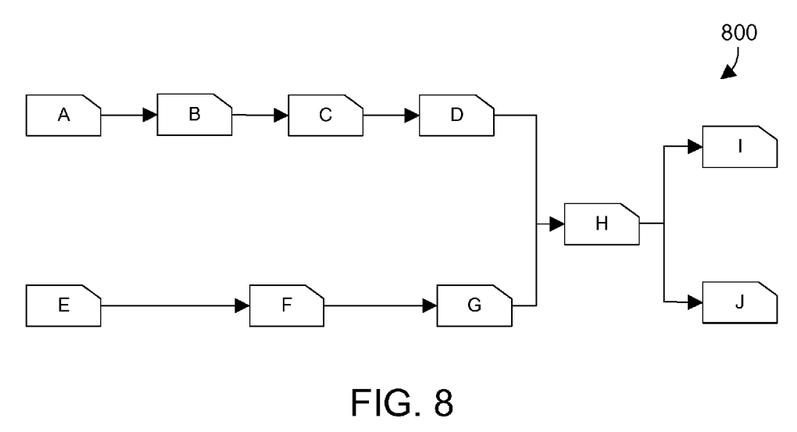
FIG. 8 is a block diagram of one specific example of a streaming application.
Figure 9:
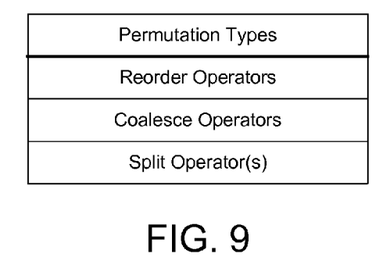
FIG. 9 is a block diagram showing examples of permutations types.

Examples are now discussed to illustrate different permutations that could be generated for a flow graph. A sample flow graph 800 is shown, which represents a sample streaming application. FIG. 9 shows examples of permutation types, and includes permutations that reorder operators, coalesce operators, and split operators. Other permutation types not listed are within the scope of the disclosure and claims herein.

Figure 10:
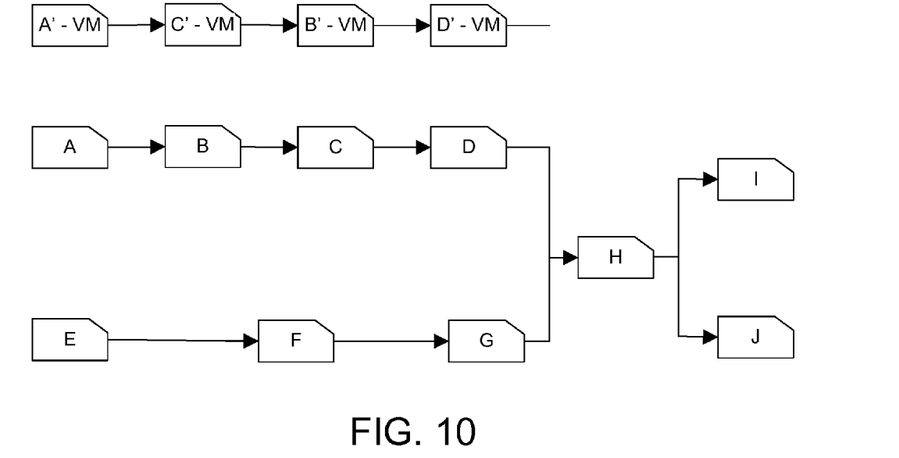
FIG. 10 is a block diagram showing the original flow graph with a permutation of the flow graph that reorders two operators.
Figure 11:
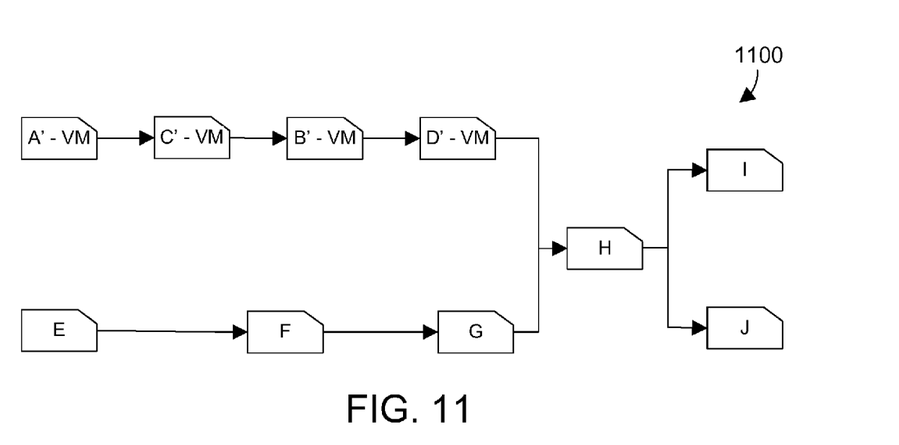
FIG. 11 is a block diagram showing replacement of the original operators A, B, C and D in the flow graph with the permutation shown in FIG. 10.

Referring to FIG. 10, we assume the streams manager determines from some threshold, criteria or heuristic that the performance of operators A, B, C and D in FIG. 8 needs to be increased. The streams manager determines that a permutation that reorders operators B and C might improve performance. The streams manager requests the cloud manager to provision four VMs, one for each operator. The streams manager then constructs a parallel path shown at A', C', B' and D', all of which are implemented in VMs, as shown in FIG. 10. The newly-deployed permutation is then run in parallel with the existing corresponding portion of the flow graph. The streams manager can then compare the performance of the original portion of the flow graph A, B, C and D to the performance of the permutation A', C', B' and D'. We assume for this example that reordering operators B and C as shown in the permutation results in sufficient increase in performance that the streams manager modifies the flow graph so the original operators A, B, C and D are replaced with the permutation A', C', B' and D', as shown in FIG. 11.

Figure 12:
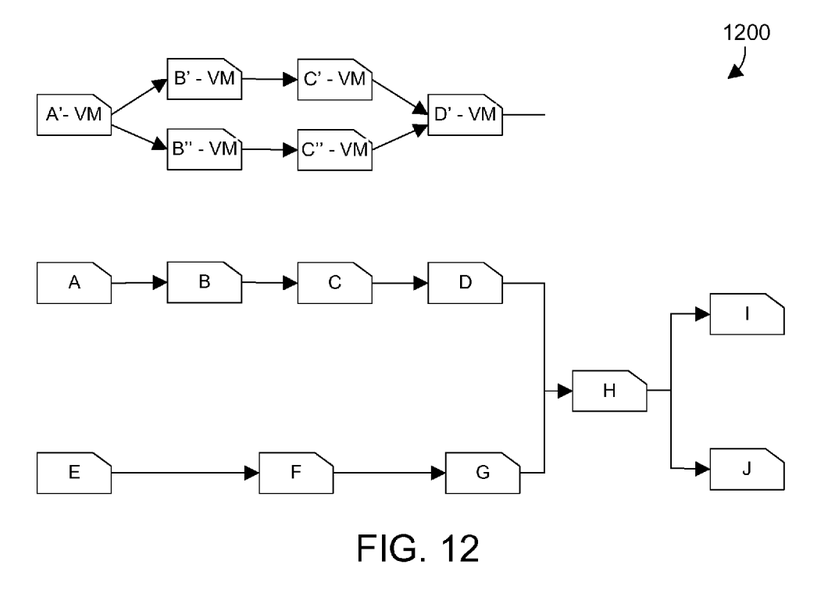
FIG. 12 is a block diagram showing the original flow graph with a permutation of the flow graph that splits two operators.
Figure 13:
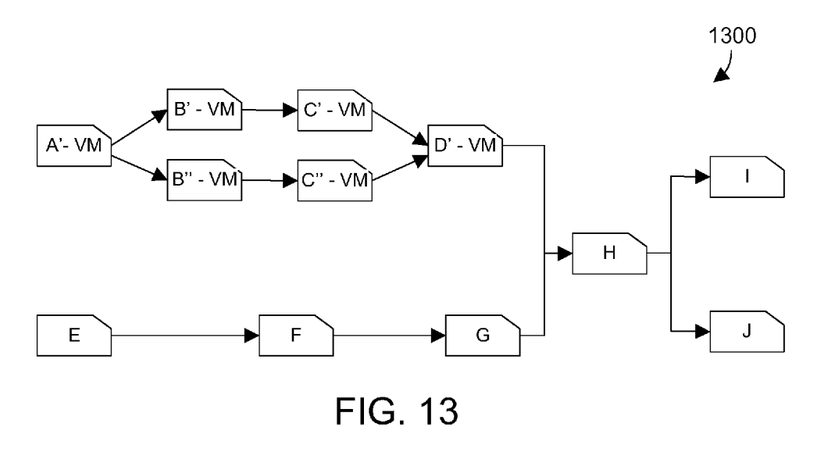
FIG. 13 is a block diagram showing replacement of the original operators A, B, C and D in the flow graph with the permutation shown in FIG. 12.

Referring to FIG. 12, we again assume the streams manager determines from some threshold, criteria or heuristic that the performance of operators A, B, C and D in FIG. 8 needs to be increased. The streams manager determines that a permutation that splits operators B and C might improve performance. The streams manager requests the cloud manager to provision six VMs. The streams manager then constructs a parallel path shown at A', B', B", C', C" and D', all of which are implemented in VMs, as shown in FIG. 12. The newly-deployed permutation is then run in parallel with the existing corresponding portion of the flow graph. The streams manager can then compare the performance of the original portion of the flow graph A, B, C and D to the performance of the permutation that includes operators A', B', B", C', C" and D'. We assume for this example that splitting operators B and C as shown in the permutation results in sufficient increase in performance that the streams manager modifies the flow graph so the original operators A, B, C and D are replaced with the permutation, as shown in FIG. 13.

Figure 14:
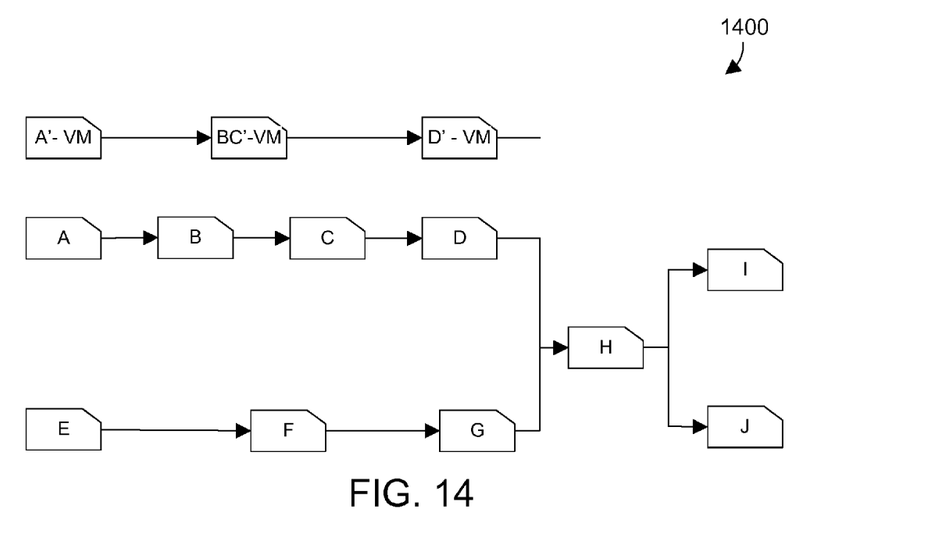
FIG. 14 is a block diagram showing the original flow graph with a permutation of the flow graph that coalesces two operators.
Figure 15:
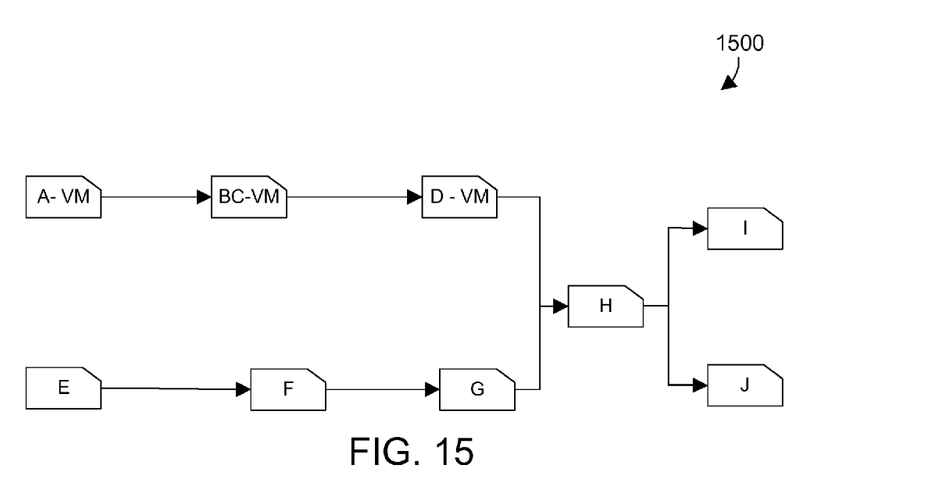
FIG. 15 is a block diagram showing replacement of the original operators A, B, C and D in the flow graph with the permutation shown in FIG. 14.

Referring to FIG. 14, we again assume the streams manager determines from some threshold, criteria or heuristic that the performance of operators A, B, C and D in FIG. 8 needs to be increased. The streams manager determines that a permutation that coalesces operators B and C might improve performance. The streams manager requests the cloud manager to provision three VMs. The streams manager then constructs a parallel path shown at A', BC' and D', all of which are implemented in VMs, as shown in FIG. 14. The newly-deployed permutation is then run in parallel with the existing corresponding portion of the flow graph. The streams manager can then compare the performance of the original portion of the flow graph A, B, C and D to the performance of the permutation that includes operators A', B C' and D'. We assume for this example that coalescing operators B and C as shown in the permutation results in sufficient increase in performance that the streams manager modifies the flow graph so the original operators A, B, C and D are replaced with the permutation A', BC' and D', as shown in FIG. 15.

In the examples given above, for the sake of illustration, a VM was provisioned for each operator in each permutation. Of course, multiple operators could be implemented in a single VM. The disclosure and claims herein expressly extend to any suitable number of operators implemented in any suitable number of VMs.

In one specific implementation, the original flow graph shown in FIG. 8 could be implemented on a dedicated computer system, while the permutations are implemented in VMs in a cloud. With this implementation, the resulting flow graphs with permutations shown in FIGS. 11, 13 and 15 will include a hybrid of operators implemented on a dedicated computer system with operators implemented in a cloud. In an alternative implementation, the original flow graph shown in FIG. 8 could also be hosted on one or more VMs in a cloud, and the permutations could also be hosted in the same or a different cloud. With this implementation, the resulting flow graphs with permutations shown in FIGS. 11, 13 and 15 will include operators that are all implemented in a cloud. Note also that multiple clouds could be used. Thus, the original flow graph shown in FIG. 8 could be implemented in a private cloud, while the permutations could be implemented in a public cloud.

The disclosure and claims herein relate to a streams manager that monitors performance of a streaming application, and when the performance needs to be improved, the streams manager automatically requests virtual machines from a cloud manager. In response, the cloud manager provisions one or more virtual machines in a cloud. The streams manager builds a permutation of a flow graph for the streaming application using the virtual machine(s), runs the permutation in parallel with the corresponding portion of the flow graph, and compares the performance of the original portion of the flow graph to the performance of the permutation. When the performance of the permutation exceeds the performance of the original part of the flow graph, the streams manager modifies the flow graph so the permutation replaces the original part of the flow graph. In this manner a streaming application can dynamically evolve to increase its performance as needed.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for improving performance of a streaming application, the method comprising:
   executing a streaming application that comprises a flow graph that includes a plurality of operators that process a plurality of data tuples;
   monitoring performance of the streaming application;
   when performance of the streaming application needs to be improved, requesting a cloud manager to provision at least one virtual machine;
   generating using the at least one virtual machine a permutation of a portion of the flow graph that provides logical equivalence of tuples of the portion of the flow graph;
   running the permutation in parallel with the portion of the flow graph;
   determining whether the performance of the permutation exceeds the performance of the portion of the flow graph; and
   when the performance of the permutation exceeds the performance of the portion of the flow graph, the streams manager modifies the flow graph to replace the portion of the flow graph with the permutation.

2. The method of claim 1 wherein the permutation comprises a reordering of at least two operators in the flow graph.

3. The method of claim 1 wherein the permutation comprises a coalescing of at least two operators in the flow graph into one operator.

4. The method of claim 1 wherein the permutation comprises a split of at least one operator in the flow graph into multiple operators.

5. The method of claim 1 wherein, when the performance of the permutation does not exceed the performance of the portion of the flow graph by a defined threshold amount, the streams manager does not modify the flow graph to replace the portion of the flow graph with the permutation.

6. The method of claim 5 wherein, when the performance of the permutation does not exceed the performance of the portion of the flow graph by the defined threshold amount, the streams manager identifies a second permutation to the flow graph and generates the second permutation to determine whether the second permutation improves the performance of the streaming application.

7. The method of claim 1 wherein the streams manager determines when the performance of the streaming application needs to be improved by comparing current performance of the streaming application to at least one performance threshold.

8. A computer-implemented method executed by at least one processor for improving performance of a streaming application, the method comprising:
   executing a streaming application that comprises a flow graph that includes a plurality of operators that process a plurality of data tuples;
   monitoring performance of the streaming application;
   when performance of the streaming application needs to be improved, requesting a cloud manager to provision at least one virtual machine, wherein the streams manager determines when the performance of the streaming application needs to be improved by comparing current performance of the streaming application to at least one performance threshold;

generating using the at least one virtual machine a first permutation of a first portion of the flow graph that provides logical equivalence of tuples of the first portion of the flow graph, wherein the first permutation comprises a reordering of at least two operators in the flow graph;

generating using the at least one virtual machine a second permutation of a second portion of the flow graph that provides logical equivalence of tuples of the second portion of the flow graph, wherein the second permutation comprises a coalescing of at least two operators in the flow graph into one operator;

generating using the at least one virtual machine a third permutation of a third portion of the flow graph that provides logical equivalence of tuples of the third portion of the flow graph, wherein the third permutation comprises a split of at least one operator in the flow graph into multiple operators;

running the first, second and third permutations in parallel with the corresponding first, second and third portions of the flow graph;

determining whether the performance of each permutation exceeds the performance of the corresponding portion of the flow graph;

when the performance of a permutation exceeds the performance of the corresponding portion of the flow graph, the streams manager modifies the flow graph to replace the corresponding portion of the flow graph with the permutation;

when the performance of a permutation does not exceed the performance of the corresponding portion of the flow graph by a defined threshold amount, the streams manager does not modify the flow graph to replace the corresponding portion of the flow graph with the permutation.

* * * * *